June 3, 1958     O. B. ECCHER     2,837,054
LABEL FEEDING AND COATING MACHINE

Filed March 11, 1955     6 Sheets-Sheet 1

ORESTE B. ECCHER
INVENTOR.

BY James G. Bethee
Attorney

June 3, 1958     O. B. ECCHER     2,837,054
LABEL FEEDING AND COATING MACHINE
Filed March 11, 1955     6 Sheets-Sheet 3

ORESTE B. ECCHER
INVENTOR.

ORESTE B. ECCHER
INVENTOR.

June 3, 1958　　　O. B. ECCHER　　　2,837,054
LABEL FEEDING AND COATING MACHINE
Filed March 11, 1955　　　　　　　　6 Sheets-Sheet 5

ORESTE B. ECCHER
INVENTOR.

June 3, 1958   O. B. ECCHER   2,837,054
LABEL FEEDING AND COATING MACHINE
Filed March 11, 1955   6 Sheets-Sheet 6

ORESTE B. ECCHER
INVENTOR.
BY James G. Bethell
Attorney.

2,837,054
LABEL FEEDING AND COATING MACHINE

Oreste B. Eccher, Brooklyn, N. Y., assignor to Potdevin Machine Co., Teterboro, N. J., a corporation of New York Application March 11, 1955, Serial No. 493,782

13 Claims. (Cl. 118—40)

This invention relates to an improvement in machines for dispensing labels and has for one of its objects to provide for drawing label webbing from a roll, parting the web at label-length intervals, and discharging the labels individually. The construction is such that the machine may be run on demand, that is, requires the services of an operator each time a label is to be dispensed; or the machine may be run continuously without the services of an operator, except to start the machine initially and to stop it at the end of a run.

A further object of my invention is to provide for treating a face of each label just before it is discharged or dispensed. For example, if the label web is ungummed, I provide for gumming each label after it has been parted from the web; or, if the web is gummed, I provide for moistening the gummed face of each label individually. The machine may be run, however, without this treating operation.

In general, my invention provides a very compact and very efficient label-dispensing machine in which I employ two pairs of rollers, one pair—web-feeding rollers—drawing the web from a roll and delivering the end of the web to the other pair of rollers, which I call parting-and-discharge rollers in that they part the web at label-length intervals and discharge the labels one by one from the machine or to the treating unit, as the case may be. The parting operation is effected by driving the parting-and-discharge rollers at a higher speed than the web-feeding rollers, so that, when the leading end of the web is nipped by the parting-and-discharge rollers, a sudden tension will be applied to the web, this tension being sufficiently high to part the web, which is perforated or otherwise weakened at label-length intervals. Because I wish to provide for handling labels of any length within the capacity of the machine, I make provision for adjusting one pair of rollers with respect to its distance from the other pair. While either or both pairs of rollers could be adjusted, I find it simpler and less involved merely to adjust the setting or positioning of the web-feeding rollers.

When the parted labels are to be treated before they are discharged from the machine, that is, either gummed or moistened, as the case may be, I provide for adjusting the gumming or moistening or other treating apparatus to accommodate the machine to labels of different lengths.

As above mentioned, the machine may be operated on demand, which requires that the operator manipulate a starting device of some sort for each label, or, when desired, the machine may be run continuously and dispense labels until the supply of web is exhausted.

In the drawings accompanying this application,

Fig. 6 is what may be termed an expanded view of some of the driving mechanism or gear trains; while

Figure 1:
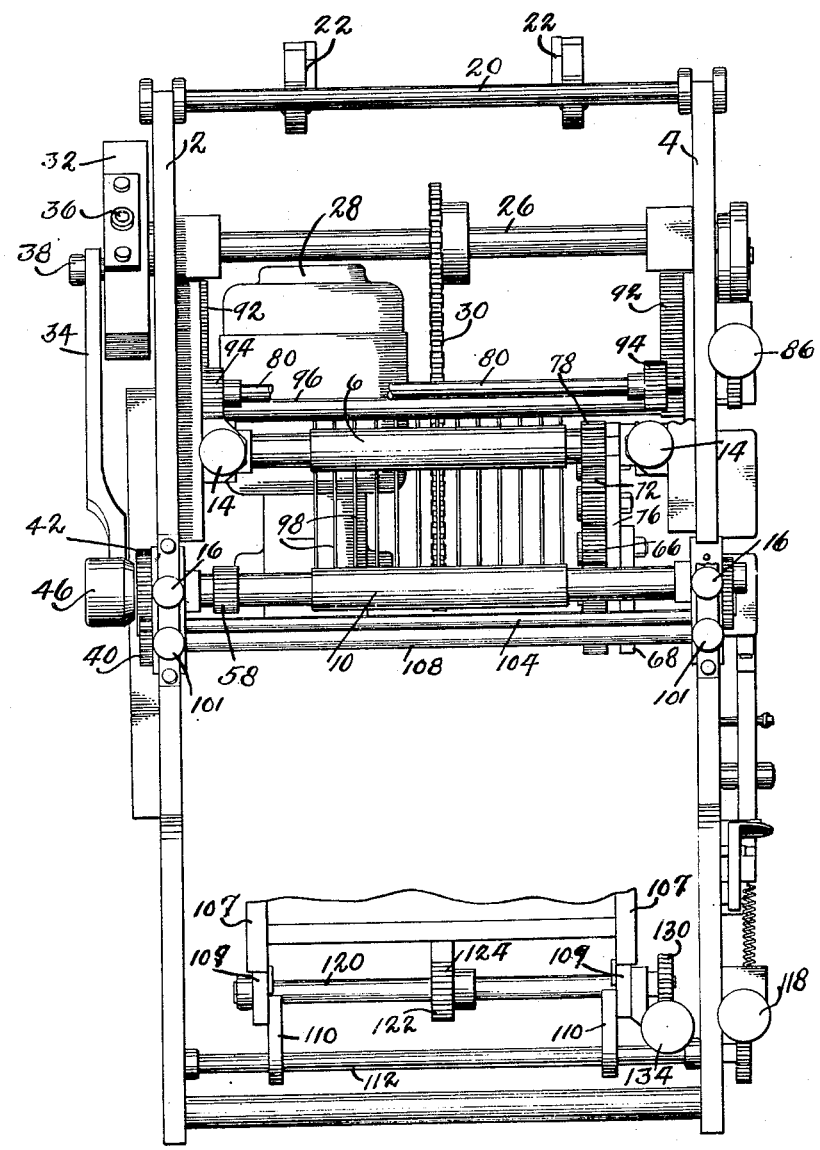
Fig. 1 is a front elevational view of an embodiment of my invention.

Referring to the drawings in detail, my improved machine comprises two side frames, designated 2 and 4 and referred to throughout the specification as the left-hand and right-hand side frames, respectively.

Essentially, my improved machine comprises two pairs of driven rollers, an upper web-feeding pair, designated 6 and 8, and a lower parting-and-discharge pair 10 and 12, the two pairs of rollers being disposed in a vertical plane relatively to each other. These rollers extend transversely of the machine and are supported in suitable bearings in or adjacent the side frames 2 and 4, as will be brought out later on herein. At this point it should be noted that the web-feeding roller 6 is capable of being adjusted to vary the pressure between it and its companion roller 8, through the medium of pressure-varying screws 14 at the front of the machine. Likewise, the pressure of the parting and delivery roller 10 with respect to its companion roller 12 is capable of being varied by the pressure-varying screws 16, which are located at the front of the machine. A roll 18 of label web is shown in broken lines in Fig. 3, the roll being mounted on rod 20, which extends across the top of the machine from side frame to side frame. Guides 22 for the roll 18 are carried by a rod 21, which is at the top of the machine and extends parallel to the rod 20. The guides 22 are at each end of the roll 18 and are adjustable relatively to each other along their supporting rod 21, so as to accommodate web supply rolls of different lengths.

The main drive shaft of the machine is designated 26 and is mounted in suitable bearings in the machine side frames 2 and 4. This drive shaft is driven by an electric motor 28, carried by the machine, through a chain drive 30. One end of the drive shaft 26 extends through the left-hand side frame 2, and mounted on the projecting end of this shaft is a crank disc 32, best seen in Fig. 2. A connecting rod 34 is attached to the crank disc 32 through the medium of crank-pin adjustment screw 36. From Fig. 2 it will be obvious that, by varying the setting of the adjusting screw 36, the throw of the crank pin 38 may be varied. This adjustment feature accommodates the machine to labels of different lengths, as will be explained later on in more detail.

Figure 2:
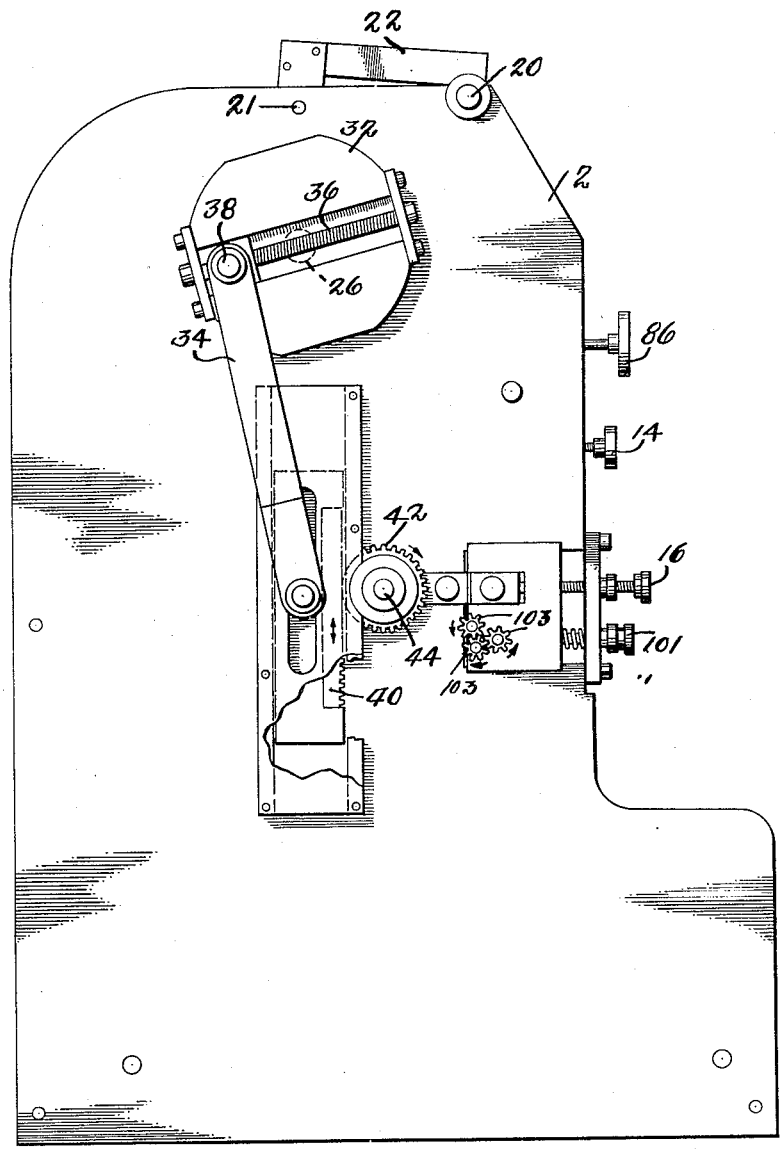
Fig. 2 is an elevational view taken at the outer face of the side frame at the left side of the machine.

The lower end of the connecting rod 34 is attached to a vertically disposed slide rack 40, which is mounted on the outer face of the machine frame 2, so that, when the motor 28 is in operation, the rack 40 will be reciprocated vertically of the machine, as indicated by the arrows thereon in Fig. 2, the length of its travel depending, of course, upon the setting (eccentricity) of the adjustable crank pin 38.

46 designates a one-way clutch at the outer face of the side frame 2. This clutch is composed of three parts: an inner member which is keyed to the shaft 44, an outer member idling on the shaft 44, to which outer member a pinion 42 is keyed, and a drive member disposed between the inner and outer members. The teeth of the slide rack 40 are in constant mesh with the pinion 42. The clutch is of such design that on the up-stroke of connecting rod 34 the slide rack 40 will rotate the pinion 42 to cause the clutch members to engage, thereby to impart motion to the shaft 44. This motion continues for a one-half revolution of the main drive shaft 26 of the machine. On the down-stroke of the rack 40, the pinion 42 is reversed in direction, so that the clutch members disengage and no motion is imparted to shaft 44.

Carried on the clutch shaft 44 is a gear 48, meshing constantly with one face of a compound gear 50, which is keyed to a shaft 52, extending transversely of the machine and mounted in suitable bearings in the two side frames of the machine. The other face of the compound gear 50 meshes with a gear 54, mounted on the shaft 56 of the rear parting and delivery roll 12. The gear 54 also meshes with a gear 58 on the shaft 60 of the front parting and delivery roll 10. Obviously, when the gear 48 is driven in a direction to rotate the compound gear 50, as indicated by the arrows in Fig. 3, the two rolls 10 and 12 will rotate as indicated by the arrows thereon.

Figure 6:
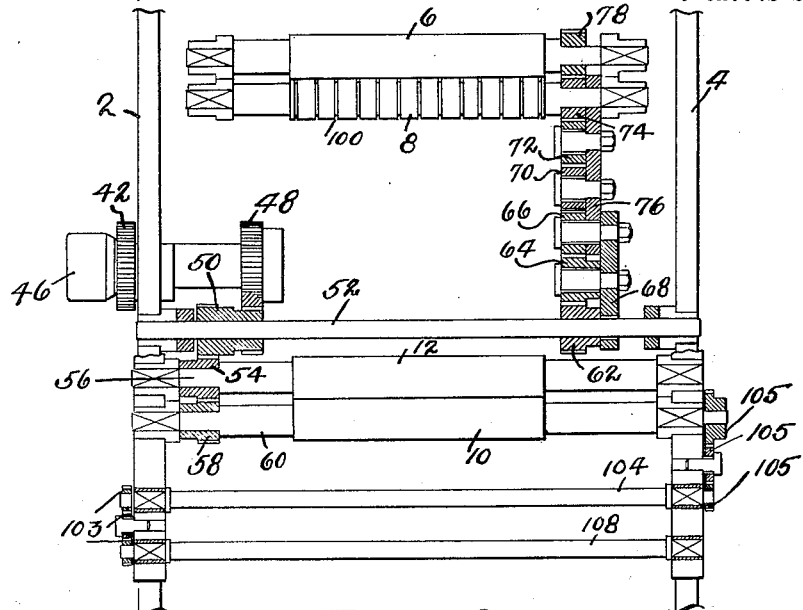
Figure 7:
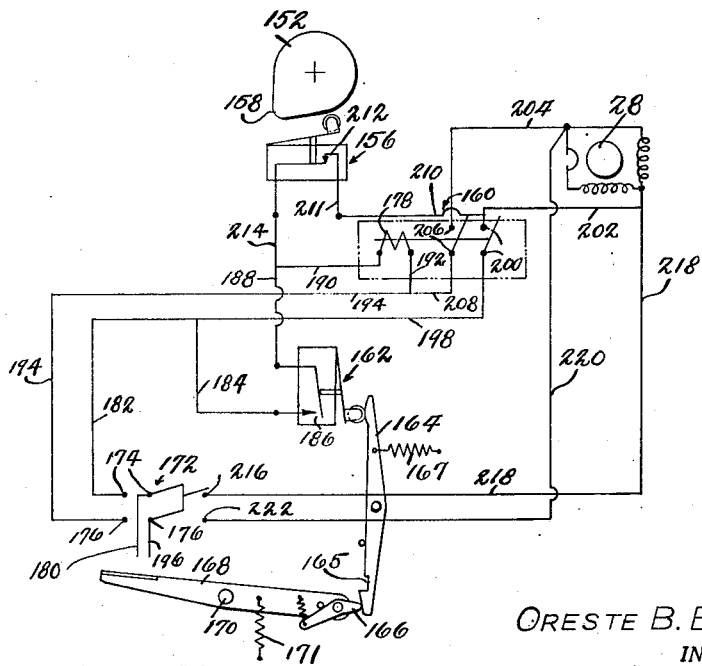
Fig. 7 is a wiring diagram showing the various control and operating circuits for the machine.

The gear train just traced is at the left-hand side of the machine, as viewed in Fig. 6, for instance. At the other side of the machine, as viewed in the same figure, is the gear train for driving the upper feed rollers 6 and 8. Keyed to the shaft 52 adjacent its right-hand end, as viewed in Fig. 6, is a gear 62 meshing with a gear 64, intermediate the gear 62 and a third gear 66. The two gears 64 and 66 are mounted on an arm or link 68, which can be oscillated on the shaft 52. The gear 66 meshes with gear 70, in mesh with intermediate gear 72, meshing with gear 74 on the shaft of the web-feeding roller 8. The two gears 70 and 72 are mounted on a link 76 which is carried by the shaft of the roller 8 and may be oscillated thereon. The gear 74 of the gear train being traced is in constant mesh with a gear 78 on the shaft of the other web-feeding roller 6.

It will be apparent that both gear trains are driven off the shaft 52, which, as above explained, is in turn driven through the one-way clutch 46 by the rack 40 and crank mechanism. The one-way clutch 46 is of such design that, on movement in one direction of the rack 40, the pinion 42 meshing therewith and, hence, gear 48 will be driven, the direction of rotation being indicated by arrows on Fig. 2. On the reverse motion of the rack 40, however, the clutch 46 is inactive, and there is no rotation of the pinion 42 and, hence, no rotation of gear 48. It will apparent, therefore, that the driving motor 28 may be running constantly, but the web-feeding rollers and the web-parting-and-discharge rollers will only be driven intermittently. It will be apparent also that the extent of rotary movement imparted to both pairs of rollers on each operation depends upon the setting of the adjustable crank pin 38.

At this point it should be noted that the ratio of the gear train for the parting-and-discharge rollers to that for the web-feeding rollers is such that at all times the parting-and-discharge rollers are driven at a higher speed than the web-feeding rollers. It will be seen that this provides for the application of sufficient tension to the label web being fed through the machine to part the web into successive label lengths at a point between the web-feeding rollers and the parting rollers.

As above noted, provision has been made so that the distance between the web-feeding rollers 6 and 8 and the web-parting-and-discharge rollers 10 and 12 may be varied without disrupting the gear train through which the web-feeding rollers 6 and 8 are driven.

Referring to this feature of the invention, 80 designates a shaft adjacent the rollers 6 and 8, which shaft is mounted in suitable bearings in the side frames 2 and 4 of the machine. One end of this shaft projects through the side frame 4 and carries a worm gear 82. a worm 84 meshing with this worm gear. The worm may be rotated from the front of the machine by means of roller-adjusting knob 86. The bearings 88 for the web-feeding rollers 6 and 8 are attached to a vertically extending slide 90, which is provided with rack teeth 92. A gear or pinion 94 is provided on each end of the roller-adjusting shaft, one of these pinions meshing with the rack teeth 92 at one side of the machine, the other meshing with the other rack teeth 92 at the other side of the machine. By adjustment of the roller-adjusting knob 86 it will be appreciated that the rack slides 90 will be moved vertically in a direction depending upon the direction of rotation of the knob, carrying with them the bearings for and, hence, the web-feeding rollers 6 and 8. By this arrangement, therefore, the distance between the web-feeding rollers and the parting-and-discharge rollers is capable of being varied so as to accommodate the machine to labels of different lengths. This adjustment of the web-feeding rollers is made without disrupting the driving gear train for these rollers. As previously noted, this gear train is carried by the links 68 and 76, and inasmuch as the adjacent ends of these two links are overlapped and pivoted together, it is quite apparent that one may adjust the rollers 6 and 8 without unmeshing any of the gears of the driving train.

Figure 3:
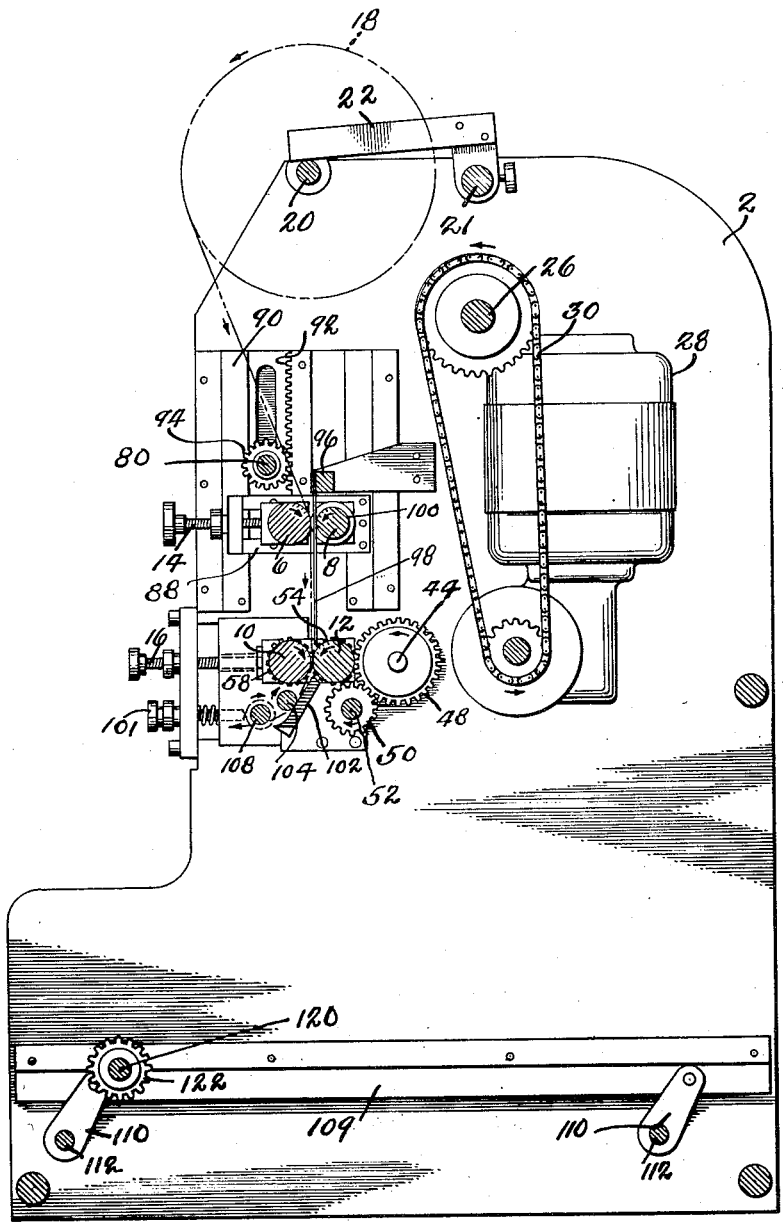
Fig. 3 is a part-sectional, elevational view taken at the inner face of the side frame at the left side of the machine.

As previously mentioned, the web is drawn off the supply roll 18 by the web-feeding rollers 6 and 8 and forwarded by them to the parting-and-discharge rollers 10 and 12, as illustrated in Fig. 3. To guide and prevent deflection of the web in its passage to the parting and discharge rollers, I provide guide wires 98, carried by transverse guide-wire supporting member 96, mounted in the machine side frames. The guide wires extend between the rollers 6 and 8, one of which is grooved, as shown at 100, to permit of this construction.

If the labels are to be discharged directly, that is, without a moistening, gluing, or other treatment, they are discharged from the parting-and-discharge rollers 10 and 12 between inclined plate 102 and roller 104 and horizontal plate 106 and roller 108 to the exterior of the machine. The rollers 104 and 108 are geared together at one end through gears 103, and the other end of roller 104 is geared to the driven parting-and-discharge roller 10 through gears 105. The rollers 104 and 108 are so mounted in the machine frame that they can be adjusted forwardly and rearwardly through adjusting screws 101, to adjust their position relatively to the bridge plate 102.

Figure 4:
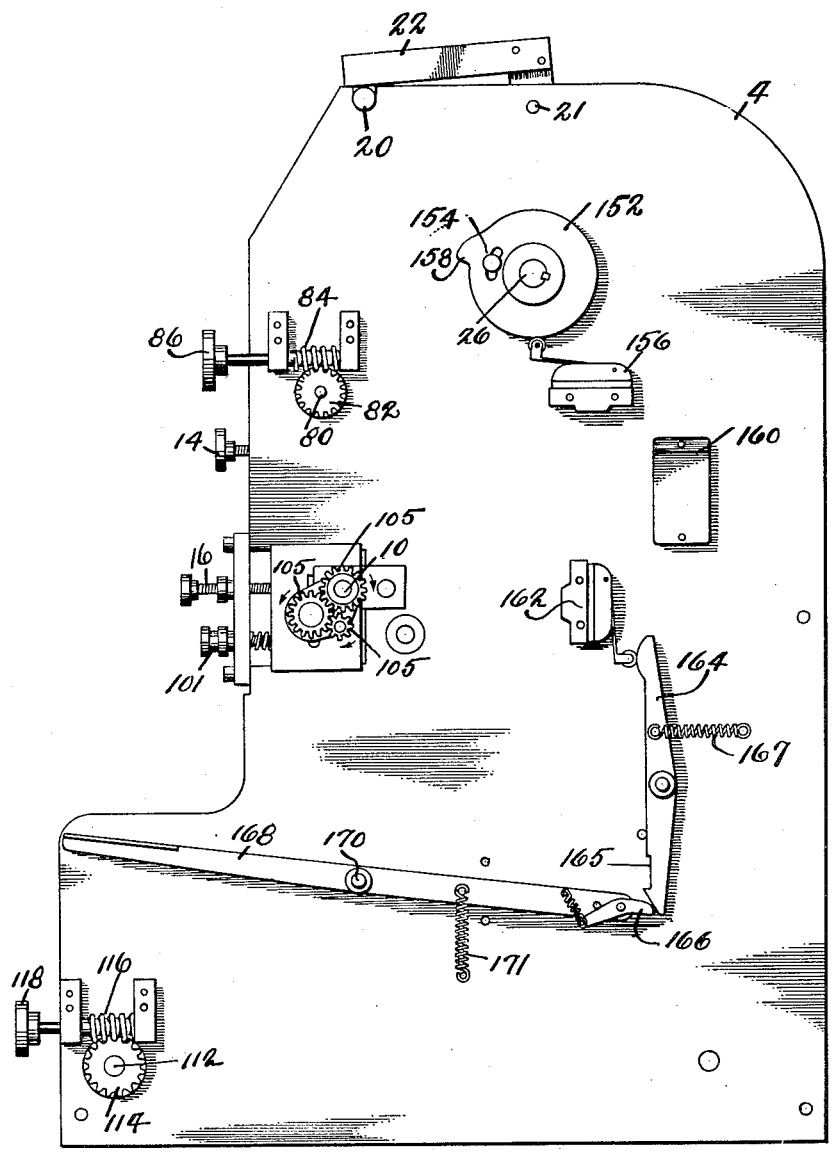
Fig. 4 is an elevational view taken at the outer face of the right-hand side frame of the machine.
Figure 5:
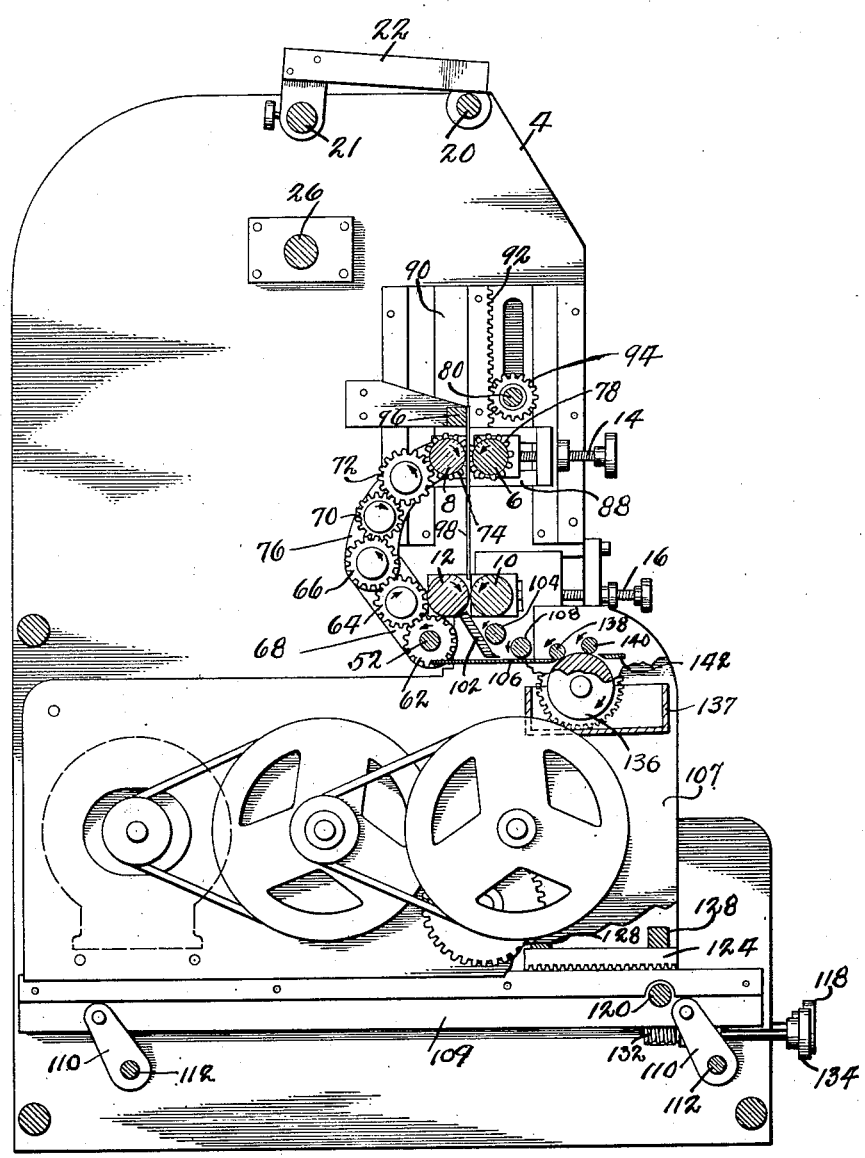
Fig. 5 is a part-sectional, elevational view taken at the inner face of the right-hand side frame of the machine.

When the labels are to be gummed, moistened, or otherwise treated after being parted from the web, then I provide the following mechanism: This mechanism comprises a pair of side frames 107, Figs. 1 and 5 supported on slide plates 109, which in turn are supported on two pairs of supporting and adjusting links 110. The side frames 107 and plates 109 are positioned between the main side frames 2 and 4 below the parting-and-discharge rollers 10 and 12, as seen in Fig. 1, for example. The supporting links 110 are pivoted at one end to the slide plates 109, and at their opposite ends are mounted on shafts 112, carried in the side frames 2 and 4. Each link 110 at the front of the machine is fast on its supporting shaft 112, and these shafts can be oscillated through the medium of a worm gear 114 and worm 116, Fig. 4. The latter is rotatable by manipulation of knob 118. Obviously, this provides for raising and lowering the slide plates 109, the side frames 107, and the mechanism carried thereby. Supported at each end by the slide plates 109 is a shaft 120, upon which is mounted a pinion 122. This pinion meshes with a rack 124, which extends rearwardly of the machine and is carried by suitable transverse members 128, secured to the side frames 107. The shaft 120 is capable of being rotated manually through a worm wheel 130, operable from the machine front by knob 134. Obviously, by manipulating the knob 134, the side frames 107 and the mechanism carried thereby can be adjusted forwardly and rearwardly. Mounted adjacent the top of the frames 107 are a roller 136 and two feed rollers 138 and 140. These rollers are driven. The roller 136 receives the glue or water or other treating material from a tank 137 in which it is rotating and which contains the treating material. As each parted 10. In a label-dispensing machine, the combination of a pair of parting-and-discharge rollers; a pair of web-feeding rollers for drawing a continuous web of labels from a supply source and feeding the web to the parting-and-discharge rollers; driving means for said rollers, the first-mentioned rollers rotating at a higher speed than the second-mentioned rollers to effect parting of the web at label-length intervals intermediate the pairs of rollers; means for varying the spacing of the pairs of rollers from each other to accommodate the machine to labels of various lengths; treating apparatus adjacent the parting-and-discharge rollers for forwarding each label as it is received from the parting-and-discharge rollers, treating one face thereof, and then discharging the treated labels consecutively from the machine; and adjusting means for adjusting said treating apparatus vertically as well as transversly of the axis of rotation of the rollers to conform to alterations in the setting of said rollers, said adjusting means comprising a rack affixed to the treating apparatus, a cooperating pinion manually driven through a worm-and-gear drive for effecting said transverse adjustment, lift links pivotally affixed to said apparatus, and a manually operable worm-and-gear drive for pivoting said links to effect said vertical adjustment.

11. In a label-dispensing machine, the combination of a pair of parting-and-discharge rollers; a pair of web-feeding rollers; driving means for said rollers, including a one-way clutch, for effecting simultaneous, intermittent rotation of said rollers in a direction to cause the web-feeding rollers to draw a continuous web of labels from a supply source and feed the web to the parting-and-discharge rollers; and gearing for coupling the said pairs of rollers to each other for rotation of the parting-and-discharge rollers at a higher speed than the pair of web-feeding rollers, the pairs of rollers being spaced at such a distance from each other and their relative peripheral speeds being such that, as the leading end of the web is nipped by the higher-speed parting-and-discharge rollers, the web will be tensioned sufficiently to part the same a label-length from the web end, the parted label being discharged by continued rotation of the parting-and-discharge rollers.

12. In a label-dispensing machine, the combination of a pair of parting-and-discharge rollers; a pair of web-feeding rollers for drawing a continuous web of labels from a supply source and feeding the web to said parting-and-discharge rollers, said rollers being disposed in a vertical plane; a gear train for gearing the two sets of rollers to each other for rotation of the parting-and-discharge rollers at a higher speed than the web-feeding rollers; means for effecting bodily movement of one pair of rollers to vary the spacing of said pairs of rollers from each other; a drive for the rollers; vertical guide wires extending from the web-feeding rollers to adjacent the parting-and-discharge rollers for preventing deflection of the label web in its passage from one set of rollers to the other; and means for varying the extent of rotary movement imparted to each of said pairs of rollers by said drive on each operation of the drive, to accommodate the machine to labels of different lengths.

13. In a label-dispensing machine, the combination of a pair of parting-and-discharge rollers; a pair of web-feeding rollers for drawing a continuous web of labels from a supply source and feeding the web to said parting-and-discharge rollers, said rollers being disposed in a vertical plane; a gear train for gearing the two sets of rollers to each other for rotation of the parting-and-discharge rollers at a higher speed than the web-feeding rollers; means for effecting bodily movement of one pair of rollers to vary the spacing of said pairs of rollers from each other; a drive for the rollers; vertical guide wires extending from the web-feeding rollers to adjacent the parting-and-discharge rollers for preventing deflection of the label web in its passage from one set of rollers to the other, one of the web-feeding rollers being grooved circumferentially to accommodate said guide wires; and means for varying the extent of rotary movement imparted to each of said pairs of rollers by said drive on each operation of the drive, to accommodate the machine to labels of different lengths.

References Cited in the file of this patent

UNITED STATES PATENTS

| | | |
|---|---|---|
| 831,113 | Sielaff | Sept. 10, 1906 |
| 977,418 | McEachron et al. | Nov. 29, 1910 |
| 2,209,765 | Cormack | July 30, 1940 |
| 2,437,735 | Getaz | Mar. 16, 1948 |
| 2,471,447 | Perkins | May 31, 1949 |
| 2,513,093 | Hageman | June 27, 1950 |
| 2,552,926 | Barnes et al. | May 15, 1951 |